United States Patent [19]

Schwerzel et al.

[11] Patent Number: 4,871,808
[45] Date of Patent: Oct. 3, 1989

[54] BINDERS WATER-DILUTABLE BY PROTONATION WITH ACID

[75] Inventors: Thomas Schwerzel, Ludwigshafen; Rolf Osterloh, Erftstadt; Eberhard Schupp, Gruenstadt; Thomas Perner, Ludwigshafen; Klaas Ahlers, Muenster, all of Fed. Rep. of Germany

[73] Assignee: BASF Lacke + Farben Aktiengesellschaft, Muenster, Fed. Rep. of Germany

[21] Appl. No.: 116,868

[22] Filed: Nov. 5, 1987

[30] Foreign Application Priority Data

Nov. 20, 1986 [DE] Fed. Rep. of Germany ....... 3639570

[51] Int. Cl.$^4$ ..................... C08G 59/14; C08L 63/02
[52] U.S. Cl. .................................... 525/113; 525/413
[58] Field of Search ..................... 525/113; 523/413

[56] References Cited

U.S. PATENT DOCUMENTS

| | | | |
|---|---|---|---|
| 4,251,415 | 2/1981 | Nakada | 525/111 |
| 4,253,930 | 3/1981 | Tsuchiya | 204/181 C |
| 4,298,656 | 11/1981 | Mendelsohn | 525/113 |
| 4,362,847 | 12/1984 | Kooijmans | 525/172 |
| 4,423,172 | 12/1983 | Otsuki et al. | 523/454 |
| 4,427,805 | 1/1984 | Kooijmans | 523/417 |
| 4,486,571 | 12/1984 | Holubka | 525/113 |
| 4,557,976 | 12/1985 | Geist | 525/107 |
| 4,568,729 | 2/1986 | Schupp | 525/523 |
| 4,617,348 | 10/1986 | Dickie et al. | 525/112 |
| 4,639,493 | 1/1987 | Dickie et al. | 525/113 |
| 4,657,979 | 4/1987 | Dickie et al. | 525/113 |

FOREIGN PATENT DOCUMENTS 1545807  5/1979  United Kingdom .

Primary Examiner—Lewis T. Jacobs
Assistant Examiner—Robert E. Lee Sellers, II
Attorney, Agent, or Firm—Keil & Weinkauf

[57] ABSTRACT

A binder which is water-dilutable on protonation with acid and obtainable by a reaction of (A) an epoxy resin having an average molecular weight of from 300 to 6,000 and on average from 1.5 to 3.0 epoxide groups per molecule and (B) from 20 to 30 mol %, based on the amount of epoxide groups present in epoxy resin (A), of one or more secondary amine and/or alkanolamine of up to 40 carbon atoms and subsequent reaction with (C) a copolymer which is based on butadiene and acrylonitrile and contains primary and/or secondary amino groups, the amount of (C) being so dimensioned that the number of primary and secondary amino groups corresponds to from 1 to 50 mol % of the epoxide groups present in the epoxy resin (A), and also (D) with one or more primary and/or secondary amine to convert any epoxide groups still present, is used in particular for cathodic electrocoating.

5 Claims, No Drawings

BINDERS WATER-DILUTABLE BY PROTONATION WITH ACID

The present invention relates to binders which are water-dilutable by protonation with acid and obtainable by reaction of (A) an epoxy resin having an average molecular weight of from 300 to 6,000 and on average from 1.5 to 3.0 epoxide groups per molecule and (B) from 20 to 80 mol%, based on the amount of epoxide groups present in epoxy resin (A), of one or more secondary amine and/or alkanolamine of up to 40 carbon atoms and subsequent reaction with (C) a copolymer which is based on butadiene and acrylonitrile and contains primary and/or secondary amino groups, the amount of (C) being so dimensioned that the number of primary and secondary amino groups corresponds to from 1 to 50 mol% of the epoxide groups present in the epoxy resin (A), and also (D) with one or more primary and/or secondary amine to convert any epoxide groups still present, and to the preparation and use thereof, in particular for cathodic electrocoating.

The use of polybutadiene and copolymers of butadiene and other vinyl monomers as an elasticizing component for producing paint systems for cathodic electrocoating is known and has been described in the patent literature.

For instance, DE-B-2,926,001 relates to paint systems where the flexible segment (butadiene-containing copolymer) is introduced into the film-forming component in such a way that a polymer of a conjugated diene or a copolymer of a conjugated diene and a vinyl monomer which each have terminal carboxyl groups is reacted with an epoxy resin.

DE-A-2,928,769 describes a resin obtained by reacting an epoxide-containing compound and a carboxyl-containing butadiene/acrylonitrile copolymer in a ratio of 1 epoxy equivalent of the first compound: about 0.2 to 0.7 equivalent of the free carboxyl groups of the copolymer with an amino-containing compound and a partially blocked isocyanato-containing compound.

According to DE-B-2,926,001 and DE-A-2,928,769, carboxyl-containing polybutadiene and carboxyl-containing butadiene/vinyl monomer copolymer respectively are used in such a way that the carboxyl groups react with the epoxide groups to form β-hydroxyester structural units. These β-hydroxyesters are known as reactive esters, being for example readily hydrolyzable.

US-A-4,486,571 describes a coating composition obtained by first reacting a butadiene/acrylonitrile copolymer terminated by secondary amino groups initially with monoepoxies and then with diepoxies. Thereafter this epoxy-modified butadiene/acrylonitrile copolymer is reacted with polyfunctional alcohols. This resin is used combined with an amine-formaldehyde resin as a coating composition. Furthermore, US-A-4,486,571 states that a cathodically depositable dispersion can be obtained by protonating the coating composition. The disadvantage of the coating composition described in US-A-4,486,571 is that protonatable nitrogen atoms, which are necessary for preparing cationic dispersions, can only be introduced via the elasticizing component. Owing to the low number of basic nitrogen atoms in the binders, which is due to the high molecular weight of the elasticizing component, the dispersion is very sensitive to pH fluctuations, which can lead to electrocoating bath instabilities.

It is an object of the present invention to provide a new binder which is stable to hydrolysis and which, on protonation with an acid, results in a dispersion which is stable to pH fluctuations and with which a highly elastic coating can be produced on a substrate.

We have found that this object is achieved with a binder which is water-dilutable by protonation with an acid and obtainable by reaction of (A) an epoxy resin having an average molecular weight of from 300 to 6,000 and on average from 1.5 to 3.0 epoxide groups per molecule and (B) from 20 to 80 mol%, based on the amount of epoxide groups present in epoxy resin (A), of one or more secondary amine and/or alkanolamine of up to 40 carbon atoms and subsequent reaction with (C) a copolymer which is based on butadiene and acrylonitrile and contains primary and/or secondary amino groups, the amount of (C) being so dimensioned that the number of primary and secondary amino groups corresponds to from 1 to 50 mol% of the epoxide groups present in the epoxy resin (A), and also (D) with one or more primary and/or secondary amine to convert any epoxide groups still present.

The present invention also provides a method of using the water-dilutable binder of the invention in the form of an aqueous dispersion which additionally contains a crosslinker with or without a pigment, an organic solvent and/or a further auxiliary substance as a coating agent, in particular for cathodic electrocoating, and a process for producing a coating by cathodic electrocoating.

Furthermore, the present invention concerns a surface-coated article obtained by applying the binder prepared according to the invention and a crosslinker and baking.

The reaction product of an epoxy resin (A), a secondary amine (B), an amino-containing butadiene/acrylonitrile copolymer (C) and an amine (D) which in turn may carry further protonatable amino groups leads to a basic binder which is variable in its basicity through suitable choice of the amine component. Combined with an uncharged crosslinker, this binder according to the invention can be converted into a stable aqueous dispersion on neutralization of only from 20 to 60%, advantageously however from 25 to 45%, of all basic nitrogen atoms in the binder.

Epoxy resin (A) can be any known resin provided they have an average molecular weight ($\overline{M}_n$) of from 300 to 6,000 and on average from 1.5 to 3.0 epoxide groups per molecule, preferably a compound having two epoxide groups per molecule.

Preference is given to epoxy resins having average molecular weights ($\overline{M}_n$) of from 350 to 5,000, in particular from 350 to 2,000. Particularly preferred epoxy resins are for example glycidyl ethers of polyphenols containing on average two or more phenolic hydroxyl groups per molecule and preparable in a conventional manner by etherification with an epihalohydrin in the presence of an alkali. Examples of suitable phenol compounds are 2,2-bis(4-hydroxyphenyl)propane (bisphenol A), 4,4'-dihydroxybenzophenone, 1,1-bis(4-hydroxyphenyl)ethane, 1,1-bis(4-hydroxyphenyl)isobutane, 2,2-bis(4-hydroxy-tert.-butylphenyl)propane, bis(2- hydroxynaphthyl)methane and 2,5-dihydroxynaphthalene. In some cases it is desirable to use aromatic epoxy resins having a higher molecular weight. These resins are obtained by reacting the abovementioned diglycidyl ethers with a polyphenol, for example 2,2-bis(4-hydroxyphenyl)propane, and further reacting the resulting products with epichlorohydrin to prepare polyglycidyl ethers.

Suitable secondary amines (B) are aliphatic and cycloaliphatic amines, for example diethylamine, dipropylamine, dibutylamine or ethylpropylamine, alkanolamines, for example methylethanolamine, ethylethanolamine, methylisopropanolamine, diethanolamine or diisopropanolamine, cyclic amines such as pyrrolidine, piperidine or morpholine and also mixtures thereof.

A suitable component (C) is a butadiene-acrylonitrile copolymer having an acrylonitrile content of from 5 to 45% by weight, preferably from 10 to 30% by weight, and a butadiene content of from 55 to 95% by weight, preferably from 70 to 90% by weight, which contains on average from 1.4 to 3.0 primary and/or secondary amino groups in the molecule and which may additionally contain tertiary amino groups. The molecular weight of the copolymer advantageously ranges from 1,000 to 15,000, preferably from 2,000 to 8,000.

For example, an amino-containing butadiene-acrylonitrile copolymer is preparable by reacting a carboxyl-containing butadiene-acrylonitrile copolymer with a diamine. Copolymers of this type are commercially available for example under the designation HYCAR® 1300X16 ATBN and HYCAR 1300X21 (from B. F. Goodrich) with 16% by weight and 10% by weight of acrylonitrile respectively.

Furthermore, an amino-containing butadiene-acrylonitrile copolymer is preparable by partial hydrogenation of a butadiene-acrylonitrile copolymer or by addition of a primary amine to an epoxide-containing butadiene-acrylonitrile copolymer.

Amine (D) may be a primary or secondary mono- and/or polyamine which may carry further functional groups, for example hexylamine, octylamine, dibutylamine, ethylbutylamine, ethylenediamine, 1,3-diaminopropane, 1,4-diaminobutane, 1,6-diaminohexane, 2-methylpentane-1,5-diamine, 4,7-dioxadecane-1,10-diamine, 4,9-dioxadodecane-1,12-diamine, 4,4'-diaminodicyclohexylmethane, 3,3'-dimethyl-4,4'-diaminodicyclohexylmethane, propanolamine, isopropanolamine, methylethanolamine, 2,2'-aminoethoxyethanol, aminoethylmethylamine, diethylenetriamine, triethylenetetramine, 3-(2-aminoethyl)aminopropylamine or dipropylenetriamine.

The mixing ratios of components A, B, C and D are variable within wide limits as long as, after the reaction, every epoxide group has been made to react.

The reaction is generally carried out by reacting the epoxy resin (A), after solution in an organic solvent or solvent mixture which can react neither with epoxide groups nor with amines, with the secondary amine (B) at from 20° to 150° C., preferably from 40° to 110° C., in a reaction time of up to 2 hours. To this reaction solution is added a mixture of the amino-containing butadiene/acrylonitrile copolymer (C) and amine (D) and made to react at from 20° to 150° C., preferably from 40° to 110° C., in a reaction time of up to 5 hours.

In this reaction the amounts of the reactants used per mole of epoxide group of component (A) are generally from 0.2 to 0.8 mole, preferably from 0.3 to 0.6 mole, of secondary amine (B), from 0.01 to 0.25 mole, preferably from 0.08 to 0.15 mole, of amino-carrying butadiene/acrylonitrile copolymer (C) and from 0.10 to 0.45 mole, preferably from 0.15 to 0.30 mole, of amine (D).

The binder resulting from this reaction has an amine number of from 40 to 230 mg of KOH per g of substance, preferably from 50 to 150 mg of KOH per g of substance.

To protonate the binder, it is possible to use inorganic and organic acids, for example formic acid, acetic acid, propionic acid, lactic acid and phosphoric acid.

Suitable crosslinkers for the binder according to the invention are for example amino resins, such as urea-formaldehyde resins, melamine resins or benzoguanamine resins, blocked isocyanate crosslinkers, crosslinkers which effect curing by way of esteraminolysis and/or transesterification and have on average two or more activated ester groups per molecule, for example β-hydroxyalkyl ester crosslinkers as described in EP 0,040,867 and carbalkoxymethyl ester crosslinkers as described in EP 102,501 and urea condensation products as described in DE-A-3,311,514.

The ratio of binder:crosslinker varies with the nature and number of groups in the binder and crosslinker which are active in the process of crosslinking. In general, the binder/crosslinking ratio used is from 0.1:1 to 9:1, but preferably from 1:1 to 9:1, particularly preferably from 1.5:1 to 4:1, based on parts by weight.

In addition to crosslinkers, it is possible to add to the binder other substances such as pigments, auxiliaries, solvents and curing catalysts.

The coating agent thus prepared can be applied in a conventional manner, such as spraying, dipping, casting or knife coating, to a substrate such as wood, glass, plastic or metal.

The curing of the coatings takes from 3 to 40 minutes at from 80° to 220° C., depending on the type of crosslinker.

For cathodic electrocoating, the solids content of the electrocoating bath is generally set at from 5 to 45% by weight, preferably from 10 to 30% by weight. Deposition customarily takes place at from 15° to 40° C. in the course of from 30 seconds to 360 seconds. The bath pH is set within the range from 4.5 to 9.0, preferably from 5.0 to 8.0. The deposition voltage is set to range from 50 to 500 volts. The article to be coated is connected as the cathode. The deposited film is baked at >90° C.

(A) Preparation of Binder

Binder 1:

384 g of a reaction product obtained from diglycidyl ether of bisphenol A and bisphenol A and having an epoxy equivalent weight of 460 were dissolved in 185 g of isobutanol at 100° C. 27 g of methylethanolamine were added dropwise at 60° C. in the course of 5 minutes and stirred in for 15 minutes. To the reaction solution was added a mixture of 521 g of a 70% strength by weight solution of an amino-containing butadiene-acrylonitrile copolymer which had a molecular weight of 3,600 and an acrylonitrile content of 16% by weight and had been prepared by reacting aminoethylpiperazine with a carboxyl-terminated butadiene-acrylonitrile copolymer, in toluene, and 20.4 g of hexamethylenediamine, the temperature was raised to 100° C., and stirring was continued for 1.5 hours. The result was a solution having a solids content of 70% by weight and an amine number of 80 mg of KOH/g.

Binder 2:

960 g of the epoxy resin of Binder 1 were dissolved at 100° C. in 486 g of isobutanol. 67.5 g of methylethanolamine were added dropwise at 60° C. in the course of 5 minutes and stirred in for 15 minutes. To the reaction solution were added a mixture of 1302.8 g of a 70% strength by weight solution of the amino-containing butadiene-acrylonitrile copolymer of Binder 1, in toluene, and 104.8 g of 3,3'-dimethyl-4,4'-diaminodicyclohexylmethane, the temperature was raised to 100° C., and stirring was continued for 1.5 hours. The result was a solution having a solids content of 70% by weight and an amine number of 76 mg of KOH/g.

Binder 3:

384 g of the epoxy resin of Binder 1 were dissolved at 100° C. in 185 g of isobutanol. 30 g of methylethanolamine were added dropwise at 60° C. in the course of 5 minutes and stirred in for 15 minutes. To the reaction solution were added a mixture of 542 g of a 70% strength by weight solution of the amino-containing butadiene-acrylonitrile copolymer of Binder 1, in toluene, and 17.2 g of hexamethylenediamine, the temperature was raised to 100° C., and stirring was continued for 1.5 hours. The result was a solution having a solids content of 70% by weight and an amine number of 84 mg of KOH/g.

Binder 4:

384 g of the epoxy resin of Binder 1 were dissolved at 100° C. in 185 g of isobutanol. 27 g of methylethanolamine were added dropwise at 60° C. in the course of 5 minutes and stirred in for 15 minutes. To the reaction solution were added a mixture of 521 g of a 70% strength by weight solution of the amino-containing butadiene-acrylonitrile copolymer of Binder 1, in toluene and 17.8 g of hexylamine, the temperature was raised to 100° C., and stirring was continued for 1.5 hours. The result was a solution having a solids content of 72% by weight and an amine number of 67 mg of KOH/g.

Binder 5:

384 g of the epoxy resin of Binder 1 were dissolved at 100° C. in 185 g of isobutanol. 27 g of methylethanolamine were added dropwise at 60° C. in the course of 5 minutes and stirred in for 15 minutes. To the reaction solution were added a mixture of 521 g of a 70% strength by weight solution of the amino-containing butadiene-acrylonitrile copolymer of Binder 1, in toluene, and 13.2 g of propanolamine, the temperature was raised to 100° C., and stirring was continued for 1.5 hours. The result was a solution having a solids content of 71% by weight and an amine number of 66 mg of KOH/g.

(B) Preparation of Crosslinker

Crosslinker 1:

504 g of trimerized hexamethylene diisocyanate were dissolved in 382 g of methyl isobutyl ketone. 388 g of dibutylamine were added dropwise at 70° C. with cooling. Stirring was continued until the isocyanate content was almost zero.

Crosslinker 2:

1,340 g of trimethylolpropane, 3,600 g of urea, 3,870 g of dibutylamine, 1,740 g of hexamethylenediamine and 3,570 g of 3,3'-dimethyl-4,4'-diaminodicyclohexylmethane were slowly heated up. From 120° C. onward ammonium was eliminated and the urea went into solution.

The temperature was raised to 155° C. in the course of 2 hours, which gave rise to substantial refluxing and precipitation of substantial amounts of a soft, crystalline precipitate. After a further 5 hours under reflux the precipitate had redissolved and a temperature of 165° C. had been reached. 3,870 g of dibutylamine were then added dropwise in the course of 2 hours. After addition was complete heating was continued at 185° C. for a further 8 hours. Thereafter 3,600 g of dibutylamine were drawn off at that temperature under reduced pressure, and after cooling down to 130° C. the residue was diluted with 5,170 g of toluene. The product was a colorless viscous liquid having a solids content of 70% by weight.

(C) Pigment Paste

To 525.8 g of binder 1 were added 168.7 g of butylglycol, 600 g of water and 17.7 ml of acetic acid. This was followed by the addition of 800 g of titanium dioxide, 11.0 g of carbon black and 50 g of basic lead silicate. The mixture was ball-milled to a particle size of less than 9 $\mu$m. The paste was then diluted with water to a solids content of 47% by weight.

EXAMPLES

Dispersions were prepared by intimately mixing binders, crosslinkers and acetic acid in the amounts stated in the table. The stated amount of water was slowly added dropwise with stirring to the mixture.

| Examples | Binder | Amount | Crosslinker | Acetic acid | Water |
|---|---|---|---|---|---|
| 1 | 1 | 798 g | 1 | 16.4 g | 1125 g |
| 2 | 1 | 794 g | 2 | 17.7 g | 1171 g |
| 3 | 2 | 791 g | 1 | 16.0 g | 1133 g |
| 4 | 3 | 800 g | 1 | 16.0 g | 1124 g |
| 5 | 4 | 776 g | 1 | 14.2 g | 1168 g |
| 6 | 5 | 781 g | 1 | 13.9 g | 1163 g |

To 1,980 g of dispersion (35% strength by weight) were added 764 g of the pigment paste, the mixture was stirred intimately and made up with water to 5,000 g.

The electocoating baths were stirred at 28° C. for 120 hours. Zinc phosphatized test panels made of steel and connected as the cathode were coated with paint films at the voltage indicated in the table in the course of 120 seconds and baked at 170° C. for 20 minutes. The table below shows the results:

| Examples | Voltage | pH | Conductance [mScm$^{-1}$] | Film thickness | Ford throw [cm] | Impact strength* [Nm] | 720 h* SSK |
|---|---|---|---|---|---|---|---|
| 1 | 330 | 6.8 | 1.9 | 21 | 20.5 | >18.08 | 0.5 mm |
| 2 | 300 | 6.6 | 2.2 | 19 | 20.0 | 17.48 | 0.3 mm |
| 3 | 350 | 6.4 | 2.1 | 17 | 21.5 | >18.08 | 0.2 mm |
| 4 | 330 | 6.8 | 1.8 | 26 | 20.5 | >18.08 | 0.4 mm |
| 5 | 330 | 6.2 | 1.9 | 22 | 19.5 | >18.08 | 0.5 mm |

-continued

| Examples | Voltage | pH | Conductance [mScm$^{-1}$] | Film thickness | Ford throw [cm] | Impact strength* [Nm] | 720 h** SSK |
|---|---|---|---|---|---|---|---|
| 6 | 270 | 6.2 | 1.8 | 19 | 19.5 | 17.18 | 0.1 mm |

*The impact strength was determined in accordance with ASTM D 2794 using a mandrel impact tester from Gardner.
**720 h SSK: underpenetration at score after 720 hours of salt spray mist exposure (in accordance with DIN 50021)

We claim:

1. A binder which is water-dilutable on protonation with acid and is obtained by reaction of
(A) an epoxy resin having a number average molecular weight of from 300 to 6,000 and on average from 1.5 to 3.0 epoxide groups per molecule and
(B) from 20 to 80 mol%, based on the amount of epoxide groups present in epoxy resin (A), of a saturated secondary monoamine of from 3 to 40 carbon atoms selected from the group consisting of an aliphatic secondary monoamine, a cycloaliphatic secondary monoamine, a secondary alkanolamine and a mixture thereof,
and subsequent reaction with
(C) a copolymer which is based on butadiene and acrylonitrile and contains primary and/or secondary amino groups, the amount of (C) being so dimensioned that the number of primary and secondary amino groups corresponds to from 1 to 50 mol% of the epoxide groups present in the epoxy resin (A), and also
(D) with an aliphatic primary or secondary amine or a dicycloaliphatic diprimary diamine or a mixture thereof to convert any epoxide groups still present.

2. A binder as defined in claim 1, obtained by using one or more dialkylamine and/or alkanolamine containing 2 to 18 carbon atoms as component (B).

3. A binder as defined in claim 1, wherein component (C) is an amino-containing butadiene/acrylonitrile copolymer which contains from 5 to 45% by weight of acrylonitrile as copolymerized units and on average from 1.4 to 3.0 primary and/or secondary amino groups in the copolymer molecule.

4. A binder as defined in claim 1, wherein the amino-containing butadiene/acrylonitrile copolymer is obtained from a carboxyl-containing butadiene/acrylonitrile copolymer and a primary and/or secondary diamine.

5. A binder as defined in claim 1, where component (D) is one or more primary and/or secondary mono- and/or polyamine.

* * * * *

UNITED STATES PATENT AND TRADEMARK OFFICE
CERTIFICATE OF CORRECTION

PATENT NO.   :   4,871,808
DATED        :   October 3, 1989
INVENTOR(S)  :   Thomas SCHWERZEL et al.

It is certified that error appears in the above-identified patent and that said Letters Patent is hereby corrected as shown below:

IN THE ABSTRACT line 6 should read:

"(B) from 20 to 80 mol %,..."

Signed and Sealed this

Eleventh Day of September, 1990

*Attest:*

HARRY F. MANBECK, JR.

*Attesting Officer*      *Commissioner of Patents and Trademarks*